(12) United States Patent
Moyer

(10) Patent No.: US 7,574,564 B2
(45) Date of Patent: Aug. 11, 2009

(54) REPLACEMENT POINTER CONTROL FOR SET ASSOCIATIVE CACHE AND METHOD

(75) Inventor: William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 537 days.

(21) Appl. No.: 11/382,903

(22) Filed: May 11, 2006

(65) Prior Publication Data

US 2007/0266207 A1    Nov. 15, 2007

(51) Int. Cl.
  *G06F 12/00* (2006.01)
  *G06F 13/00* (2006.01)
(52) U.S. Cl. ............... 711/128; 711/100; 711/118; 711/154
(58) Field of Classification Search ......... 711/100, 711/117–118, 121, 125, 128–129, 154, 123
  See application file for complete search history.

(56) References Cited

U.S. PATENT DOCUMENTS

| | | | |
|---|---|---|---|
| 5,848,433 A * | 12/1998 | Tran et al. | 711/137 |
| 6,418,521 B1 | 7/2002 | Mathews et al. | |
| 6,490,654 B2 | 12/2002 | Wickeraad et al. | |
| 6,560,676 B1 * | 5/2003 | Nishimoto et al. | 711/128 |
| 6,643,738 B2 * | 11/2003 | Timmer et al. | 711/128 |
| 6,941,442 B2 * | 9/2005 | Devereux | 711/207 |
| 6,976,128 B1 | 12/2005 | Williams et al. | |
| 7,039,756 B2 * | 5/2006 | Emerson et al. | 711/108 |
| 7,069,388 B1 * | 6/2006 | Greenfield et al. | 711/133 |

OTHER PUBLICATIONS e200z6 PowerPC™ Core Reference Manual; 2004; http://www.freescale.com/files/32bit/doc/ref_manual/E200Z6_RM.pdf; Title Page, Table of Contents (pp. iii-xiv), pp. 1-14 thru 1-18, 2-55 thru 2-67, 4-1, 4-2 thru 4-22, 6-1 thru 6-18, 10-33 thu 10-34; Freescale Semiconductor, Inc.; USA.

* cited by examiner

*Primary Examiner*—Tuan V. Thai
(74) *Attorney, Agent, or Firm*—Robert L. King; Joanna G. Chiu

(57) ABSTRACT

A set associative cache includes a plurality of sets, where each set has a plurality of ways. The set associative cache has a plurality of replacement pointers where each set of the plurality of sets has a corresponding replacement pointer within the plurality of replacement pointers, and the corresponding replacement pointer indicates a way of the set. A cache command is provided which specifies a set of the plurality of sets and which specifies a replacement way value. In response to the cache command, a current way value of the replacement pointer corresponding to the specified set is replaced with the replacement way value. The cache may further include way locking control circuitry which indicates whether or not one or more ways is locked. By indicating a locked way with the replacement way value, a locked way can be overridden and thus be used for a subsequent cache line fill.

20 Claims, 2 Drawing Sheets

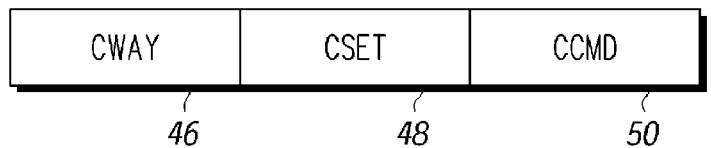

*FIG. 3*

| NAME | DESCRIPTION |
|---|---|
| CWAY | CACHE WAY<br>  SPECIFIES THE DATA CACHE WAY TO BE SELECTED |
| CSET | CACHE SET<br>  SPECIFIES THE CACHE SET TO BE SELECTED |
| CCMD | CACHE COMMAND<br>  00 = THE DATA CONTAINED IN THIS ENTRY IS INVALIDATED WITHOUT FLUSHING<br>  01 = THE DATA CONTAINED IN THIS ENTRY IS FLUSHED IF DIRTY AND VALID WITHOUT INVALIDATION<br>  10 = THE DATA CONTAINED IN THIS ENTRY IS FLUSHED IF DIRTY AND VALID AND THEN IS INVALIDATED<br>  11 = RESET WAY REPLACEMENT POINTER TO POINT TO CWAY |

*FIG. 4*

REPLACEMENT POINTER CONTROL FOR SET ASSOCIATIVE CACHE AND METHOD

FIELD OF THE INVENTION

The present invention relates generally to cache memories, and more particularly to management of set associative cache memory used by data processors.

BACKGROUND OF THE INVENTION

Cache memories are prevalent in data processing systems. Two common cache organizational structures are known as fully associative cache arrays and set associative arrays. Set associative caches have a number of sets, indexed by an address value, where each set contains a number of storage locations commonly referred to as "ways". One way of a particular set is selected each time a cache line is addressed.

Various conventional caches permit the locking of ways of a set associative cache. When locked, cache lines within a way cannot be replaced or written with a new tag value. Locking mechanisms provide an inexpensive mechanism to ensure that critical information, either instructions or data, is always accessed from the cache, which is faster than addressing system memory. Information is preloaded into a specified way for each cache set and then locked to prevent future replacement. Therefore, the number of long latency cache misses can be minimized with the use of selective locking of cache ways. The locking of ways in a set associative cache however must be used carefully to avoid severely restricting use of cache memory for the execution of applications.

When set associative caches are desired to have data stored or written, there is often an operating condition wherein the desired address associated with the data is not present in the cache. Conventional set associative caches have replacement circuitry that functions to determine what existing address to overwrite the new data with. The maintenance and overhead associated with this functionality adds additional expense to a data processor and typically delays operation of the set associative cache.

BRIEF DESCRIPTION OF THE DRAWINGS

The present invention is illustrated by way of example and not limitation in the accompanying figures, in which like references indicate similar elements, and in which:

FIG. 3 illustrates in diagrammatic form one example of a format of the way replacement pointer control register of FIG. 2; and FIG. 4 illustrates in table form one example of an implementation of control fields within the way replacement pointer control register of FIG. 3.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Figure 1:
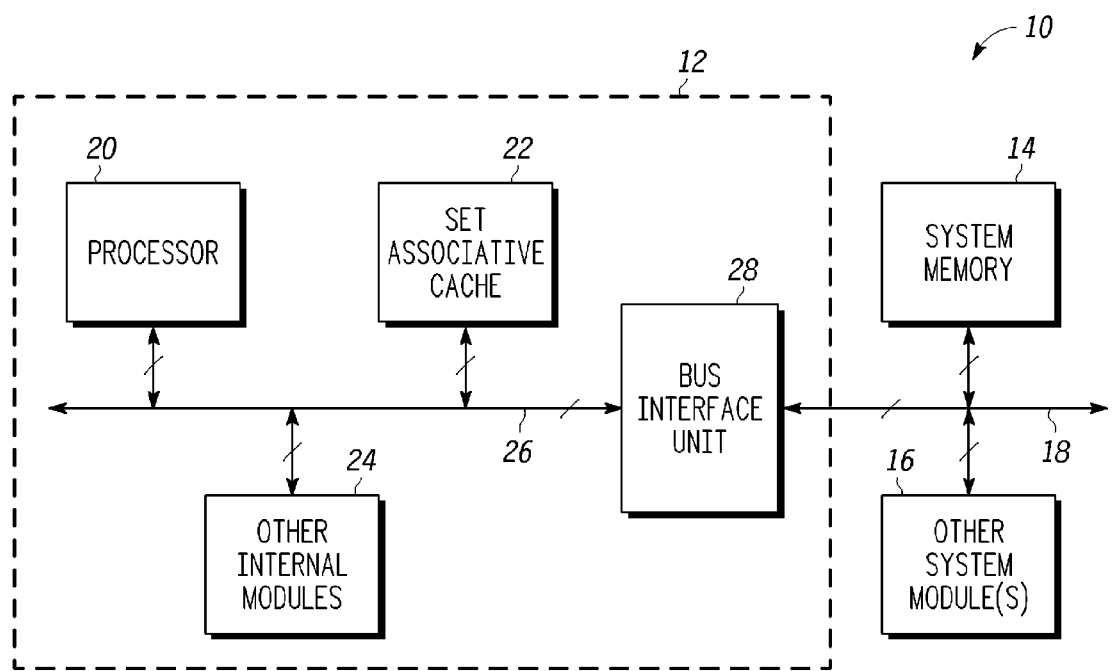
FIG. 1 illustrates in block diagram form a data processing system in accordance with one form of the present invention.

Referring to FIG. 1, in one embodiment, a data processing system 10 includes an integrated circuit 12, a system memory 14 and one or more other system module(s) 16. The integrated circuit 12, system memory 14 and the one or more other system module(s) 16 are connected via a multiple conductor system bus 18. Within the integrated circuit 12 is a processor 20 that is connected to a set associative cache 22 via a multiple conductor internal bus 26. Also connected to the internal bus 26 are other internal modules 24 and a bus interface unit 28. The bus interface unit 28 has a first multiple conductor input/output terminal connected to the internal bus 26 and a second multiple conductor input/output terminal connected to the system bus 18. It should be understood that data processing system 10 is exemplary. Other embodiments include all of the illustrated elements on a single integrated circuit or variations thereof.

Figure 2:
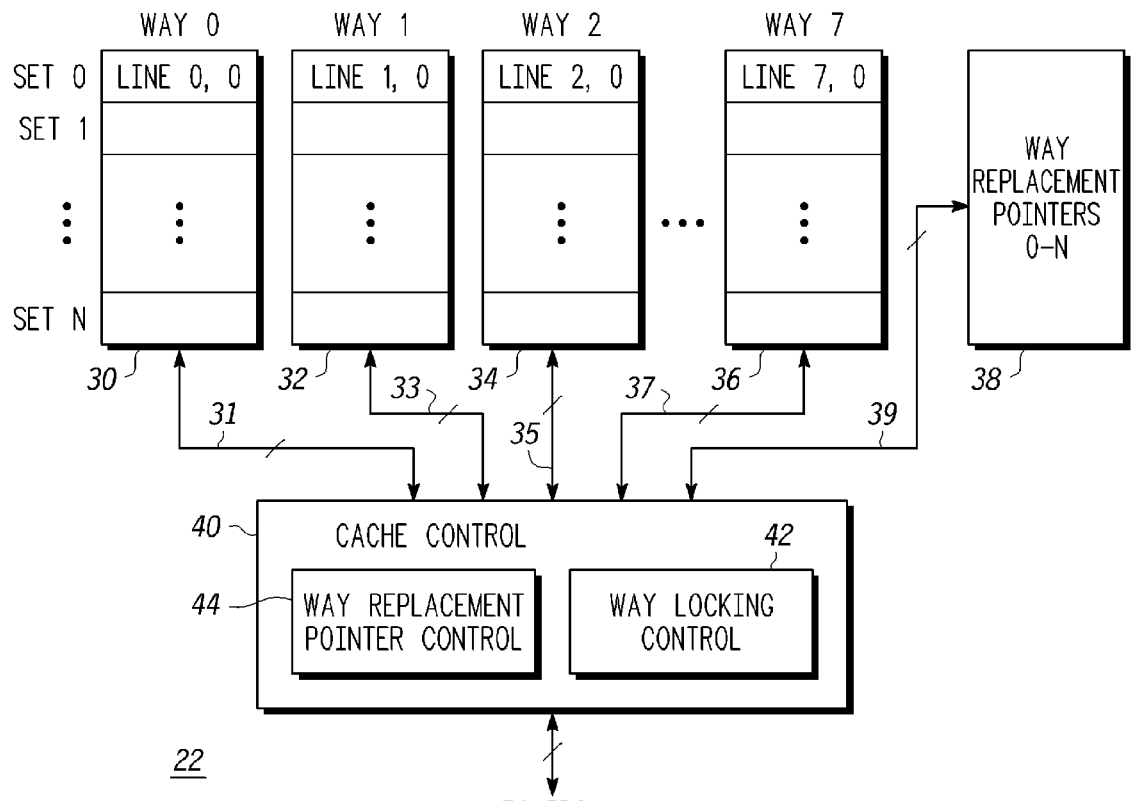
FIG. 2 illustrates block diagram form one example of the set associative cache of FIG. 1.

In operation, the integrated circuit 12 performs predetermined data processing functions wherein processor 20 executes instructions and utilizes the other illustrated elements in the performance of the instructions. To make quick memory reads and writes, the set associative cache 22 is used. Should the information being read or written by processor 20 not be in the set associative cache 22 the system memory 14 is used. Since the system memory 14 is further removed from processor 20 than the set associative cache 22, accesses to the system memory 14 are slower and are thus desired to be minimized. To minimize the use of system memory 14, the set associative cache 22 uses a replacement pointer system to efficiently determine what data entry should be overwritten when processor 20 desires to write information to an address not already present in the set associative cache 22. Reference to FIG. 2 will assist in the explanation of the replacement pointer system.

Illustrated in FIG. 2 is an exemplary form of various possible embodiments of the set associative cache 22. For simplicity the set associative cache 22 is illustrated as having eight ways, identified as Way 0, Way 1, Way 2 ... Way 7. Each of the ways is divided into (N+1) sets. In the illustrated form a set is made up of a cache line from each of the ways. For example, the set labeled Set 0 has a line in each way respectively labeled Line 0,0 thru Line 7,0 where the first number identifies the way number and the second number identifies the set number. Each of the ways is accessed via a bidirectional bus by cache control circuitry 40. Bus 31 connects Way 0 to the cache control circuitry 40 and bus 33 connects Way 1 to the cache control circuitry 40. Similarly bus 35 connects Way 2 to the cache control circuitry 40 and bus 37 connects Way 7 to the cache control circuitry 40. A group of (N+1) way replacement pointers is stored in a register 38. A bidirectional multiple-bit bus 39 connects the register 38 to the cache control circuitry 40. Within the cache control circuitry 40 is a way replacement pointer control register 44 and a way locking control register 42. The cache control circuitry 40 has an input/output connected to processor 20 for receiving and providing information between the processor 20 and the set associative cache 22.

In operation, the set associative cache 22 is organized to have a plurality of sets in which each set has a plurality of ways. Each set has a dedicated way replacement pointer, each of which functions to point to a respective way within that set. Thus a replacement pointer exists for each way. When set associative cache 22 is addressed by processor 20 to access information from the set associative cache 22, if the address does not exist in the set associative cache, the respective way replacement pointer for the set in register 38 is used to point to an appropriate line for replacement. The line that register 38 is pointing to is replaced with the new information. The pointer value that exists in register 38 is determined in part by the way replacement pointer control register 44 in cache control circuitry 40. In normal operation of the cache, replacement algorithm logic within the cache control circuitry 40 maintains replacement pointer values in register 38 according to the implemented replacement algorithm. As described herein this logic is augmented by providing a cache command 45 which may be written to the way replacement pointer control register 44. The cache command 45 specifies a set of the plurality of (N+1) sets for the replacement pointer to select. The cache command 45 also specifies a replacement way value for the pointer to point to. When this specific cache command 45 is performed, the replacement pointer corresponds to the specified set it updated to point to the specified replacement way. In this manner, the cache command 45 enables the determination of a specific way for replacement for the next cache line allocation for the selected set. Subsequently, the way replacement pointer is updated for each replacement in the set by logic within cache control circuitry 40 using well-known algorithms such as least recently used (LRU), round-robin or first-in, first-out (FIFO). The cache command 45 provides interactively overriding the default way replacement pointer value determined by the hardware replacement algorithm implemented by the cache control logic 40 for a selected set.

Illustrated in FIG. 3 is an exemplary cache command 45 that is written to the way replacement pointer control register 44 to effect modification of the normal replacement pointer value determined by cache control logic 40. In the illustrated form there are three portions or fields of the cache command 45. A field 50 identifies the command functionally as a cache command, CCMD. A field 48 identifies the cache set, CSET, for the pointer to point to. A field 46 identifies the cache way, CWAY, for the pointer to point to. In response to the value of the cache command 45, the cache control circuitry 40 creates a way replacement pointer for the specific set and identifies what way within the set should be the replacement entry to be written to. When the replacement way value, CWAY, indicates a different way of the specified set, CSET, than the current way value, the cache control circuitry 40 replaces the current way value of the replacement pointer.

Illustrated in FIG. 4 are exemplary encodings for the fields 46, 48 and 50 of the cache command 45. In the illustrated form, the cache command field 50 is illustrated as being two bits in size. When the bits assume a value of "00" cache control circuitry 40 functions to invalidate the data in the set associative cache 22 for the indicated way and set without flushing or removing the data from the set associative cache 22. When the bits assume a value of "01" cache control circuitry 40 functions to flush or remove the data in the set associative cache 22 for the entry in the indicated line and set if the data in the identified line has been modified and is therefore designated as being "dirty". The line is then made valid and permitted to remain in a valid condition (i.e. no invalidation). When the bits assume a value of "10" cache control circuitry 40 functions to flush or remove the data in the set associative cache 22 for the entry in the indicated line if the data is designated as being both dirty and valid. The entry in the indicated line is then made invalid by appropriately clearing a validity bit within the entry. When the bits assume a value of "11" cache control circuitry 40 responds by resetting the way replacement pointer corresponding to the set indicated by the CSET field 48 that is within way replacement pointers 38 to point to the cache way that is designated within the corresponding CWAY field 46. It should be understood that other encodings in addition to or in lieu of these encodings may be implemented. For example, another encoding function is to replace the current way value without affecting cache lines of the specified cache set. Another encoding function is to replace the current way value without affecting the replacement pointers corresponding to sets other than the specified set.

The way locking control register 42 provides a method to be able to selectively lock a way in the set associative cache 22 from being modified with different cache lines. When the way locking control register 42 identifies a specific way as being locked, the cache control circuitry 40 will not permit any cache line entries within the way to be replaced. However, in one form the cache command 45 may be implemented so that the CWAY field 46 will nonetheless override a locking value in the way locking control register 42 when the value of the CWAY field 46 identifies a locked way. The overriding may be implemented in various ways including always overriding a locked way or selectively overriding a locked way by a control bit or value. Such a locking override control bit or value may be implemented as a portion of the CWAY field 46 or by other control mechanisms. By providing the ability to selectively override locking of a way of the cache for a specific set for the duration of a single cache line replacement, the cache line in the locked way may be subsequently replaced without affecting the locking of all other lines within the locked way. Without this capability, an undesired consequence of attempting to replace a single line in a locked cache way would be that the way would need to be first unlocked, the no-longer desired line replaced by a newly desired line, and then the way would be re-locked. During the interval that the way remains unlocked, other undesired cache line replacements could occur to desired lines within the temporarily unlocked way. As described herein, in data processing system 10 no temporary unlocking of the way is required in order to replace a line within the locked way.

By now it should be appreciated that there has been provided an inexpensive mechanism and method to control replacement pointer value on an individual set basis in a set associative cache. Set-by-set control is provided while minimizing cost and required area. The replacement pointer control disclosed herein is independent of the type of replacement pointer algorithm that a system uses. In other words, regardless of whether a least recently used (LRU), pseudo LRU, round robin or other replacement pointer algorithm. As a result the performance of cache management operations is simplified and improved. Cache loading operations are simplified and the testing and diagnostic operations for way-locking cache designs are also simplified. The cache command 45 or instruction of FIG. 3 selects a specific cache set in a set associative cache and indicates the next way to be replaced for a particular set. The cache command 45 allows software to pre-select a specific way to be replaced in a set by modifying the replacement pointer to point to a desired way in the set on a set-by-set basis. Thus diagnostic software and cache way locking algorithms are provided with a straight-forward mechanism to control cache line replacement. No dependency or reliance on knowledge of cache line replacement logic and the history of state changes is required. There is herein provided a cache replacement command that provides a replacement way value. Control logic is responsive to the command and selects a specific set and way in a cache and updates the replacement logic for the selected set to point to the way that is indicated.

In one form there is provided a method by providing a set associative cache having a plurality of sets. Each set has a plurality of ways and the set associative cache has a plurality of replacement pointers. Each set of the plurality of sets has a corresponding replacement pointer within the plurality of replacement pointers. The corresponding replacement pointer indicates a way of the set. A cache command is provided and identifies a specified set of the plurality of sets and a replacement way value. In response to the cache command, a current way value of the replacement pointer corresponding to the specified set is replaced with the replacement way value. The replacement way value indicates a different way of the specified set than the current way value. In another form the cache command is provided from values stored in a control register. In one form the control register is software accessible. In another form replacing the current way value of the replacement pointer in response to the cache command is performed without affecting cache lines of the specified cache set. In yet another form replacing the current way value of the replacement pointer in response to the cache command is performed without affecting the replacement pointers corresponding to sets other than the specified set. In one form in response to a desired data value missing from a corresponding set of the cache, a cache line fill of a way of the corresponding set indicated by the corresponding replacement pointer is performed. After performing the cache line fill, the way of the corresponding set indicated by the corresponding replacement pointer is locked. In another form the set associative cache has way locking control circuitry which indicates whether or not one or more ways of the set associative cache is locked. In yet another form the replacement way value indicates a locked way. In yet a further form after replacing the current way value of the replacement pointer corresponding to the specified set with the replacement way value, a cache line fill of a way of the specified set indicated by the replacement way value is performed.

In another form there is herein provided a method of providing a set associative cache. The cache has a plurality of sets, each set having a plurality of ways. A plurality of replacement pointers is provided, each set of the plurality of sets having a corresponding replacement pointer within the plurality of replacement pointers. The corresponding replacement pointer indicates a way of the set. There is provided way locking control circuitry which indicates whether or not one or more ways are locked. A cache command specifies a set of the plurality of sets and specifies a replacement way value, wherein the way locking control circuitry indicates that a way indicated by the replacement way value is locked. In response to the cache command, a current way value of the replacement pointer corresponding to the specified set is replaced with the replacement way value which indicates the locked way. In another form after replacing the current way value of the replacement pointer corresponding to the specified set with the replacement way value, a cache line fill of the locked way of the specified set indicated by the replacement way value is performed. In one form the cache command is provided from values stored in a software accessible control register.

In yet another form there is provided a data processing system having a processor and a set associative cache coupled to the processor. The set associative cache has a plurality of sets, each set having a plurality of ways and a plurality of replacement pointers. Each set of the plurality of sets has a corresponding replacement pointer within the plurality of replacement pointers. The corresponding replacement pointer indicates a way of the set. Control circuitry is coupled to the plurality of replacement pointers. In response to a cache command specifying a set of the plurality of sets and specifying a replacement way value, the control circuitry replaces a current way value of the replacement pointer corresponding to the specified set with the replacement way value. In one form the control circuitry is a control register and the control register stores the cache command. In another form the control register is accessible by software executing on the processor. In yet another form the control circuitry replaces the current way value of the replacement pointer corresponding to the specified set in response to the cache command without affecting cache lines of the specified cache set. In yet another form the control circuit replaces the current way value of the replacement pointer corresponding to the specified set in response to the cache command without affecting the replacement pointers corresponding to sets other than the specified set. In yet another form the set associative cache further includes a way locking control register which indicates whether or not one or more ways are locked. In a further form the replacement way value indicates a locked way, and the locked way is indicated by the way locking control register. In yet another form the control circuitry, in response to a processor memory access instruction missing in the set associative cache, performs a cache line fill into the locked way.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

What is claimed is:

1. A method, comprising:
   providing a set associative cache having a plurality of sets, each of the plurality of sets having a plurality of ways, the set associative cache having a plurality of replacement pointers, each of the plurality of sets having a corresponding replacement pointer within the plurality of replacement pointers, the corresponding replacement pointer indicating a way of a corresponding set;

providing a cache command which identifies a specified set of the plurality of sets and which identifies a replacement way value;

in response to the cache command, replacing a current way value of the replacement pointer corresponding to the specified set with the replacement way value, the replacement way value indicating a different way of the specified set than the current way value;

in response to a desired data value missing from a corresponding set of the cache, performing a cache line fill of a way of the corresponding set indicated by a corresponding replacement pointer; and after performing the cache line fill, locking the way of the corresponding set indicated by the corresponding replacement pointer.

2. The method of claim 1, wherein the cache command is provided from values stored in a control register.

3. The method of claim 2, wherein the control register is software accessible.

4. The method of claim 1, wherein replacing the current way value of the replacement pointer in response to the cache command is performed without affecting cache lines of the specified set of the plurality of sets.

5. The method of claim 1, wherein replacing the current way value of the replacement pointer in response to the cache command is performed without affecting the plurality of replacement pointers corresponding to sets other than the specified set of the plurality of sets.

6. The method of claim 1, further comprising:

using a cache command function field of the cache command and implementing one of: (1) invalidating data without flushing the data; (2) flushing data if the data is dirty and is valid, the flushing being done without invalidating the data; (3) flushing data if the data is dirty and is valid, the data being invalidated after the flushing; or (4) resetting the corresponding replacement pointer to the specific cache way identified in the first field.

7. The method of claim 1, wherein the set associative cache has way locking control circuitry which indicates whether or not one or more ways of the set associative cache is locked.

8. The method of claim 1, wherein the replacement way value indicates a locked way.

9. The method of claim 1, further comprising:

after replacing the current way value of the replacement pointer corresponding to the specified set with the replacement way value, performing a cache line fill of a way of the specified set indicated by the replacement way value.

10. A method, comprising:

providing a set associative cache comprising:

a plurality of sets, each set of the plurality of sets having a plurality of ways;

a plurality of replacement pointers, each set of the plurality of sets having a corresponding replacement pointer within the plurality of replacement pointers, the corresponding replacement pointer indicating a way of the set; and way locking control circuitry which indicates whether or not one or more ways are locked;

providing a cache command which specifies a set of the plurality of sets to identify a specified set and which specifies a replacement way value, wherein the way locking control circuitry indicates that a way indicated by the replacement way value is a locked way; and in response to the cache command, replacing a current way value of the replacement pointer corresponding to the specified set with the replacement way value which indicates the locked way;

after the replacing the current way value of the replacement pointer corresponding to the specified set with the replacement way value, in response to a desired data value missing from a corresponding set of the cache, performing a cache line fill of a way of the corresponding set indicated by a corresponding replacement pointer; and after performing the cache line fill, locking the way of the corresponding set indicated by the corresponding replacement pointer.

11. The method of claim 10, further comprising:

using a cache command function field of the cache command and implementing one of: (1) invalidating data without flushing the data; (2) flushing data if the data is dirty and is valid, the flushing being done without invalidating the data; (3) flushing data if the data is dirty and is valid, the data being invalidated after the flushing; or (4) resetting the corresponding replacement pointer to the specific cache way identified in the first field.

12. The method of claim 10, wherein the cache command is provided from values stored in a software accessible control register.

13. A data processing system, comprising:

a processor; and a set associative cache coupled to the processor, the set associative cache comprising:

a plurality of sets, each set of the plurality of sets having a plurality of ways;

a plurality of replacement pointers, each set of the plurality of sets having a corresponding replacement pointer within the plurality of replacement pointers, the corresponding replacement pointer indicating a way of that set;

control circuitry coupled to the plurality of replacement pointers, the control circuitry, in response to a cache command specifying a set of the plurality of sets to identify a specified set and specifying a replacement way value, replaces a current way value of the replacement pointer corresponding to the specified set with the replacement way value; and a way locking control register which indicates whether or not one or more ways are locked, the replacement way value indicating a locked way and the locked way indicated by the way locking control register, and the control circuitry, in response to a processor memory access instruction missing in the set associative cache, performs a cache line fill into the locked way.

14. The data processing system of claim 13, wherein the control circuitry comprises a way replacement pointer control register, the way replacement pointer control register storing the cache command.

15. The data processing system of claim 14, wherein the way replacement pointer control register is accessible by software executing on the processor.

16. The data processing system of claim 13, wherein the control circuitry replaces the current way value of the replacement pointer corresponding to the specified set in response to the cache command without affecting cache lines of the specified set.

17. The data processing system of claim 13, wherein the control circuit replaces the current way value of the replacement pointer corresponding to the specified set in response to the cache command without affecting the plurality of replacement pointers corresponding to sets other than the specified set.

18. The data processing system of claim 13, wherein the cache command comprises three fields, a first field identifying a specific cache way, a second field identifying a specific cache set and a third field identifying a cache command function.

19. The data processing system of claim 18, wherein the cache command function is one of: (1) invalidating data without flushing the data; (2) flushing data if the data is dirty and is valid, the flushing being done without invalidating the data; (3) flushing data if the data is dirty and is valid, the data being invalidated after the flushing; or (4) reset the corresponding replacement pointer to the specific cache way identified in the first field.

20. The data processing system of claim 19, wherein the processor and the set associative cache are implemented on an integrated circuit and are coupled to a system memory and one or more other system modules that are external to the integrated circuit.

* * * * *